United States Patent Office 3,506,452
Patented Apr. 14, 1970

3,506,452
PHOTOCHEMICAL PROCESS FOR DETOXIFICATION OF FUNGAL METABOLITES
Jett C. Arthur, Jr., Metairie, and James A. Robertson, Jr., New Orleans, La., assignors to the United States of America as represented by the Secretary of Agriculture
No Drawing. Filed Apr. 28, 1966, Ser. No. 545,845
Int. Cl. A23j 1/14
U.S. Cl. 99—17                 5 Claims

ABSTRACT OF THE DISCLOSURE

Aflatoxin $B_1$ was detoxified by irradiating with a mercury, short-arc, point-source, high-pressure lamp (100 watts) for about from 60 to 120 minutes, thereby destroying the fluorescent properties and consequently its toxic properties.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the exposure of materials which are contaminated with toxic fungal metabolites to intense sources of light having wavelengths which excite the toxin molecule, and, due to the energy retained within the toxin molecule, results in the destruction of its fluorescent properties and consequently its toxic properties.

The main object of this invention is the modification of chemical properties of fungal metabolites, while absorbed in the solid state on protein containing materials, to detoxify these matreials by a photochemical process thereby improving the wholesomeness of these protein-containing materials for use in foodstuffs.

In recent years there have been outbreaks of disease in poultry and fish in different parts of the world. The contributions of protein containing feeds, contaminated by processing and fungal metabolites, have been and are being investigated extensively in numerous laboratories throughout the world. It has been shown that fungal metabolites, elaborated by the mold *Aspergillus flavus* on protein containing substrates such as vegetable oilseed meals, are very toxic to poultry and fish, leading to disease.

The isolation and determination of the physical and chemical properties of crystalline forms of the toxins, usually referred to as aflatoxins, have been reported. The aflatoxins are soluble, for example, in methanol and chloroform. The ultraviolet absorption spectra of aflatoxin B, molecular weight 312, showed maxima at 2230, 2650, and 3630° A. with a fluorescence spectrum peak at 4290 A. There seems to be a relationship between toxicity and the amount of fluorescence in the ultraviolet. A procedure for screening vegetable oilseed meals for aflatoxin toxicity for livestock feeds is based on a fluorescence test.

Several obvious processes to attempt decontamination of vegetable oilseed meals after the mold has elaborated the aflatoxin are: extraction of the toxins with selected solvents; destruction of the toxin by the use of heat, high energy radiation, or added chemicals. The solvent extraction of the toxins from the meals has low feasibility, because of the large amounts of meals to be processed including desolventization, to remove extremely minute quantities of toxins. The toxins are apparently not heat labile, and in any event the use of heat could have a detrimental effect on the other nutritional properties of the feeds. The use of high energy radiation would be a chemically nonspecific effect, and furthermore there is no evidence for a chain reaction leading to destruction of the toxin. Consequently, large dosages of high energy radiation would be required to effect destruction of the toxin with simultaneously induced detrimental effects in other nutritional properties of the meals. Due to the extremely small amount of toxin in the meal, probably large quantities of added chemicals would be required to effect destruction of the toxin. Obviously, the addition of large quantities of chemicals to the meals would affect the other nutritional properties of the meals.

Our present invention is an improvement over these processes in that: (1) the process proposed is selective in its effect on the destruction of toxins thereby causing minimum change in the other nutritional properties of the meals; (2) the process proposed is adaptable to treatment of meals in a flour or other highly comminuted form in a continuous process; (3) the process proposed does not require the addition or removal of any chemicals or solvents to the meals to effect detoxification thereby minimizing any detrimental effects on the other nutritional properties of the meals; (4) the process proposed would require relatively simple handling equipment, usually already available at feed processing plants thereby minimizing plant changes or investments.

Our present invention makes use of the known excitation and fluorescence spectra of the toxins. For example, the energy equivalents selectively absorbed by aflatoxin B are: at 2230 A., 5.6 electron volts, or 129 kilocalories per mole; at 2650 A., 4.7 electron volts, or 108 kilocalories per mole; and at 3630 A., 3.4 electron volts, or 78 kilocalories per mole. The absorbed energy emitted during fluorescence at 4290 A. is 2.9 electron volts, or 67 kilocalories per mole. We have discovered that by exposing aflatoxin B in solution or in a solid form to light having a spectral distribution in the excitation range of the toxin and having a high luminous intensity, the fluorescence of the toxin can be greatly reduced, thereby reducing its toxicity. From the technical data given it can be seen that as much as 62 kilocalories per mole can be deposited within the toxin molecule. This is evident by the difference between the 129 kilocalories per mole absorbed at 2230 A. and 67 kilocalories per mole of energy emitted. Similarly, the difference between the energy equivalent absorbed at 2650° A., i.e. 108 kilocalories per mole and the 67 kilocalories per mole of energy emitted is 41 kilocalories per mole of residual energy. Our discovery, that by using a light source of sufficiently high luminous intensity the destruction, probably cleavage, of the chemical groups responsible for fluorescence and toxicity, can be effected, makes possible a highly selective process for the detoxification of fungal metabolites. In actual plant processing the contaminated meal in a flour or other highly comminuted form could be passed as a thin layer on an endless belt arrangement through a tunnel in which high pressure mercury lamps are mounted. The thin layer could also be agitated aerodynamically to increase the surface area exposed and consequently to maximize the absorption of the light energy by the toxin.

Good control of the amount of radiation required for any particular material is easily achieved by means of known methods of analysis (e.g., thin layer chromatography).

The following examples illustrate our invention in greater detail:

EXAMPLE 1

Aflatoxin $B_1$ (15 micrograms) in chloroform (1 ml.) was irradiated for 60 minutes at 25° C. by a mercury, short-arc, point-source, high-pressure lamp, rated at 100 watts and a luminous intensity of 140,000 candles per square centimeter. On analysis of the irradiated toxin by thin layer chromatography, the original amount of aflatoxin $B_1$ decreased to 2 micrograms and decreased 87 percent in fluorescence.

EXAMPLE 2

Aflatoxin $B_1$ (15 micrograms) in chloroform (1 ml.) was irradiated for 110 minutes at 25° C. by a mercury, short-arc, point-source, high-pressure lamp, rated at 100 watts and a luminous intensity of 140,000 candles per square centimeter. On analysis of the irradiated toxin by thin layer chromatography, the original amount of aflatoxin $B_1$ decreased to a trace amount and decreased almost 100 percent in fluorescence.

EXAMPLE 3

Aflatoxin (15 micrograms) in a solid form was irradiated for 120 minutes at 25° C. by a mercury, short-arc point-source, high-pressure lamp, rated at 100 watts and a luminous intensity of 140,000 candles per square centimeter. On analysis of the irradiated toxin by thin layer chromatography, the original amount of aflatoxin $B_1$ decreased to 4 micrograms and decreased 73 percent in fluorescence.

We claim:

1. A process for photochemically detoxifying aflatoxins comprising exposing said aflatoxins to a light source with wavelengths of 2230 and 2650 angstrom units having energy equivalents of 129 and 108 kilocalories per mole, respectively, for about from 60 to 120 minutes during which time light of these wavelengths is selectively absorbed by the aflatoxin molecule thereby exciting the said aflatoxin molecule to immediately emit characteristic fluorescent light of 4290 angstrom units having an energy equivalent of 67 kilocalories per mole, leaving residual energy in the excited aflatoxin molecule of 62 and 41 kilocalories per mole, respectively, which causes chemical bond cleavage and destroys the fluorescent properties of the aflatoxin and, consequently, its toxic properties.

2. The process of claim 1 wherein the aflatoxins are present as contaminants in a protein-containing material useful as a foodstuff.

3. The process of claim 1 wherein the aflatoxins are present as contaminants in a vegetable oilseed meal.

4. The process of claim 1 wherein the wavelength in the light source is 2230 angstrom units having an energy equivalent of 129 kilocalories per mole and wherein the residual energy is 62 kilocalories per mole.

5. The process of claim 1 wherein the wavelength in the light source is 2650 angstrom units having an energy equivalent of 108 kilocalories per mole and wherein the residual energy is 41 kilocalories per mole.

References Cited

UNITED STATES PATENTS 2,482,507  9/1949  Rentschler et al. _____ 99—218

HOWARD S. WILLIAMS, Primary Examiner

U.S. Cl. X.R.

99—217; 204—158